US005687099A

United States Patent [19]

Gross et al.

[11] Patent Number: 5,687,099

[45] Date of Patent: Nov. 11, 1997

[54] BODY SUPPORT WITH ADAPTIVE PRESSURIZATION

[76] Inventors: Clifford M. Gross, 1A Harbor Court West, Roslyn Harbor, N.Y. 11576; Thomas J. Cassar, 40 Panarama Dr., Huntington, N.Y. 11743; Cindy Hongzheng Lu, 6 Florence Ave., Syosset, N.Y. 11791

[21] Appl. No.: 384,103

[22] Filed: Feb. 6, 1995

[51] Int. Cl.[6] ........................................ G01N 7/00

[52] U.S. Cl. ........................................ 364/558; 297/284.3

[58] Field of Search ........................................ 364/558; 5/616; 36/29; 297/284.1–284.11

[56] References Cited

U.S. PATENT DOCUMENTS

| | | |
|---|---|---|
| 3,192,461 | 6/1965 | Moore . |
| 3,330,598 | 7/1967 | Whiteside . |
| 3,363,941 | 1/1968 | Wierwille . |
| 3,867,732 | 2/1975 | Morrell . |
| 4,190,286 | 2/1980 | Bentley . |
| 4,213,213 | 7/1980 | Burnett . |
| 4,467,252 | 8/1984 | Takeda et al. . |
| 4,542,547 | 9/1985 | Sato . |
| 4,583,305 | 4/1986 | Miyamoto . |
| 4,634,179 | 1/1987 | Hashimoto et al. . |
| 4,655,505 | 4/1987 | Kashiwamura et al. . |
| 4,686,722 | 8/1987 | Swart . |
| 4,730,403 | 3/1988 | Walkhoff . |
| 4,890,235 | 12/1989 | Reger et al. . |
| 4,949,412 | 8/1990 | Goode . |
| 4,999,932 | 3/1991 | Grim . |
| 5,060,174 | 10/1991 | Gross . |
| 5,170,364 | 12/1992 | Gross et al. . |
| 5,176,424 | 1/1993 | Tobita et al. . |
| 5,230,249 | 7/1993 | Sasaki et al. . |
| 5,283,735 | 2/1994 | Gross et al. . |

FOREIGN PATENT DOCUMENTS

| | | |
|---|---|---|
| 0 168 213 A2 | 7/1985 | European Pat. Off. . |
| 0 302579 A1 | 3/1988 | European Pat. Off. . |

*Primary Examiner*—James P. Trammell

[57] ABSTRACT

An apparatus for supporting a body portion in a preferred embodiment has a plurality n of inflatable members $M_i$ (i=1, . . . , n) in a desired configuration. Each member is individually adjustable to a desired pressure from a pressure source. The apparatus also has a pressure-sensing arrangement for sensing the pressure in each of the members $M_i$. Furthermore the apparatus has a control arrangement for adjusting the pressure in the members $M_i$ according to a protocol. The protocol includes the steps of (i) initially inflating each member $M_i$ until a predetermined condition has been achieved;

(ii) determining the pressure $P_{Oj}$ (j=i) of each member $M_i$ resulting after initial inflation;

(iii) determining the desired pressure $P_{Di}$ of each member $M_i$ as a function $F_i$ of the pressures $P_{Oj}$ (j=1, . . . n) obtained in step (ii), such that $P_{Di}=F_i(P_{01}, \ldots, P_{Dn})$; and (iv) adjusting the pressure of each member $M_i$ to a final pressure $P_{Fi}$ that matches the desired pressure determined for such member in step (iii), such that $P_{Fi}=P_{Di}=F_i(P_{01}, \ldots, P_{Dn})$.

40 Claims, 2 Drawing Sheets

BODY SUPPORT WITH ADAPTIVE PRESSURIZATION

TECHNICAL FIELD

The present invention relates to apparatus and methods for adaptively configuring body supports of the type (such as in certain beds, seats, and athletic shoes) using inflatable members.

BACKGROUND ART

Prior patents issued for inventions of one or more of the coinventors herein, and assigned to the present assignee, have addressed the configuration of load-bearing surfaces in body supports. U.S. Pat. No. 5,060,174, entitled "Method and Apparatus for Evaluating a Load Bearing Surface Such as a Seat" (issued Oct. 22, 1991) concerned the establishment of pressure distributions over a load bearing surface, such as a seat, in a manner associated with the comfort of human subjects supported on the surface. U.S. Pat. No. 5,170,364, entitled "Feedback System for Load Bearing Surface" (issued Dec. 8, 1992) concerned the adjustment, by means of an appropriate servo-mechanism, of elements of a load bearing surface to provide a load distribution associated with comfort. These patents are hereby incorporated herein by reference.

It is known to provide inflatable supports having bladders inflated under microprocessor control. Target pressure values for the bladders are stored. The bladder pressures are monitored by pressure transducers, and the measured pressures are compared with the target pressures; air under pressure is supplied to each bladder until the comparison indicates that the target pressure has been reached. See U.S. Pat. No. 4,655,505 issued Apr. 7, 1987 for an invention of Kashiwamura et al. and European patent application published as number 0122666 on Oct. 24, 1984 for an invention of Swart. Utilizing this approach, it would be possible to store a set of target pressures for each individual utilizing the support, and have the individual intending to use the support select the appropriate set of target pressures prior to use of the support. The requirement of preselecting a set of target pressures, however, is inconvenient, and the alternatives to this requirement have their own disadvantages. One alternative is to reconfigure a whole set of target pressures each time a different individual uses the support. Another alternative is to utilize a single set of target pressures for all individuals. The first alternative leads to potentially greater inconvenience than the requirement it is designed to supersede, whereas the second alternative may result in a compromise of the comfort available to a range of individuals, since what is comfortable for one individual of a certain build may not be comfortable for another individual of a different build.

SUMMARY OF THE INVENTION

In accordance with a preferred embodiment of the invention there is provided an apparatus for supporting a body portion. The apparatus has a plurality n of inflatable members $M_i$ ($i=1, \ldots, n$) in a desired configuration. Each member is individually adjustable to a desired pressure from a pressure source. The apparatus also has a pressure-sensing arrangement for sensing the pressure in each of the members $M_i$. Furthermore the apparatus has a control arrangement for adjusting the pressure in the members $M_i$ according to a protocol. The protocol includes the steps of (i) initially inflating each member $M_i$ until a predetermined condition has been achieved;

(ii) determining the pressure $P_{Oj}$ ($j=i$) of each member $M_i$ resulting after initial inflation;

(iii) determining the desired pressure $P_{Di}$ of each member $M_i$ as a function $F_i$ of the pressures $P_{Oj}$ ($j=1, \ldots n$) obtained in step (ii), such that $P_{Di}=F_i(P_{01}, \ldots, P_{Dn})$; and (iv) adjusting the pressure of each member $M_i$ to a final pressure $P_{Fi}$ that matches the desired pressure determined for such member in step (iii), such that $P_{Fi}=P_{Di}=F_i(P_{01}, \ldots, P_{Dn})$. The term "body portion", as used in this description and the following claims, means a portion (up to the entire extent) of the body of a human subject. Although in the description below, much of the discussion is in terms of the entire body of a subject, the discussion is equally applicable to a body portion. The order of steps (i) and (ii) of the protocol is not necessarily critical. Thus step (i) may be performed first for each member $M_i$, and thereafter step (ii) may be carried out; that is, first all the members may be inflated, then their pressures may be measured. Alternatively, steps (i) and (ii) may be performed individually for each member: that is, first member $M_1$ may be inflated and then its pressure may be read; next member $M_2$ may be inflated and then its pressure may be read; and so on, until all members have been inflated and their pressures after initial inflation have been determined.

In a preferred embodiment, the function $F_i$ of the pressures $P_{Oj}$ includes the weighted sum of the pressures $P_{Oj}$, so that the desired pressures $P_{Di}$ of the members $M_i$ reflect the total effective weight of the body portion. The term "weighted sum" as used in the description and in the claims includes the case wherein the weights are unity, i.e., a simple sum.

DETAILED DESCRIPTION OF SPECIFIC EMBODIMENTS

This application discloses technology that offers improvements to that disclosed in commonly assigned pending applications Ser. No. 08/277,230, filed Jul. 19, 1994, and Ser. No. 08/340,541, filed Sep. 12, 1994, each entitled "Support Enhancing Device and Associated Method"; these applications are hereby incorporated herein by reference.

We have found that in the case of body supports having inflatable members, comfort is affected is not merely by the distribution of the subject's body weight over the body support, but also by the subject's body weight itself.

Figure 1:
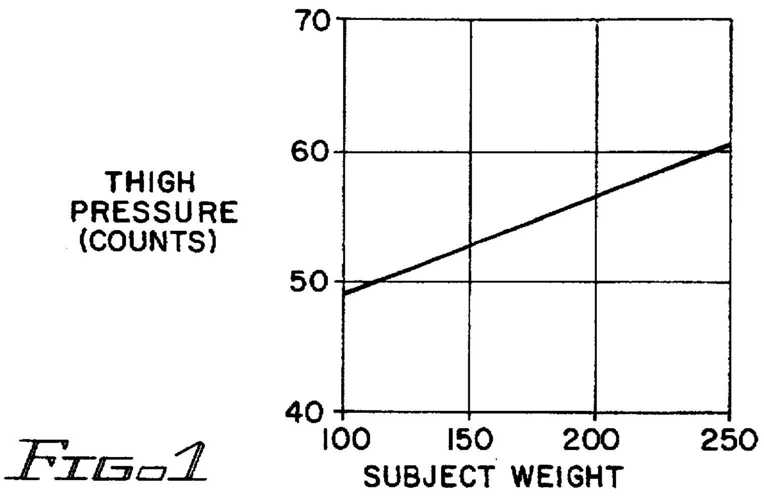
FIG. 1 is a plot showing the effect of subject weight on desired thigh pressure for maintaining subjective comfort.

In addressing the issues posed by our observations, we have found that for a subject of increasing weight, subjective comfort is enhanced by increasing the pressure of the inflatable members. FIG. 1 is a plot showing the effect of subject weight on desired thigh pressure for maintaining subjective comfort. In this plot the subject weight is shown in pounds; the thigh pressure is shown in arbitrary units. It is thus a feature of a preferred embodiment of the invention that the pressure of the inflatable members may be adaptively adjusted as a function of effective subject weight.

Figure 2:
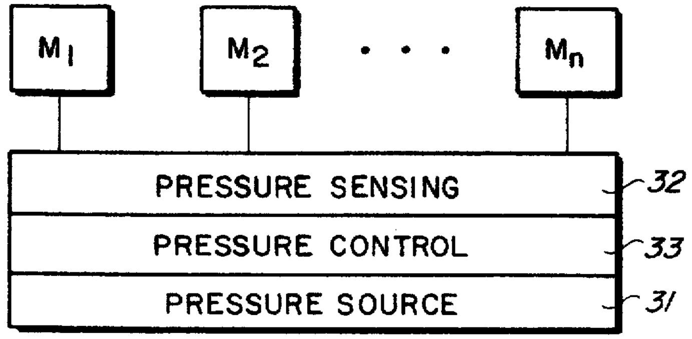
FIG. 2 is a schematic diagram of an apparatus of the type to which embodiments of the present invention is applicable.

FIG. 2 is a schematic diagram of an apparatus of the type to which embodiments of the present invention is applicable. A number n of inflatable members $M_i$ (i=1, . . . , n) are provided in an apparatus for supporting a body portion. (As mentioned above, the portion may include the entire body, and solely for convenience the following discussion is in that context.) The apparatus may be any of a variety of types for supporting a body portion of a subject, including, for example, a bed, or a seat (either stationery or in a vehicle, for example), or an athletic shoe. Each inflatable member in the apparatus is individually adjustable to a desired pressure from a pressure source 31. A pressure-sensing arrangement 32 senses the pressure in each of the members $M_i$. A pressure control arrangement 33 adjusts the pressure in each of the members $M_i$.

The pressure control arrangement is realized typically by a microprocessor in a manner well known in the art. The microprocessor is typically in communication with one or more pressure transducers constituting the pressure sensing arrangement 32, a series of valves associated with the members $M_i$, and a pressure source, which may for, example, be realized by a pump. Further details of the hardware are discussed in connection with FIGS. 4 and 5 below.

Figure 3:
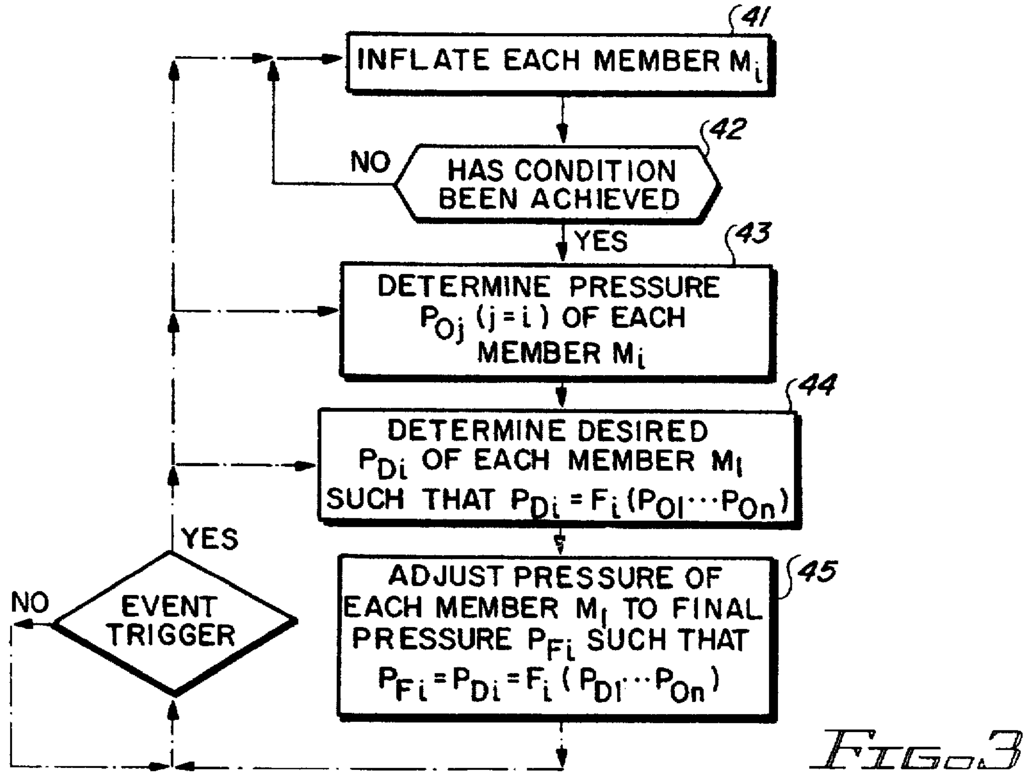
FIG. 3 is a diagram showing the procedures followed in achieving control of pressure of inflatable members in accordance with a preferred embodiment of the present invention.

In accordance with a preferred embodiment of the present invention there is provided a protocol for operation of the pressure control arrangement 33 for adjustment of the pressure. The protocol is typically implemented as software or firmware guiding operation of the microprocessor discussed above. FIG. 3 shows the protocol followed in achieving control of pressure of each inflatable member $M_i$ in accordance with such a preferred embodiment. The protocol begins in step 41 by inflating each member $M_i$ via the pressure source 31, until a predetermined condition has been achieved. As condition to embarking in this step, preferably in come embodiments, the members may be deflated or opened to ambient pressure to assure uniform starting conditions. In step 42, the achievement of the condition is tested; if it has not, inflation continues; if it has been achieved, then inflation terminates, and the protocol proceeds to step 43. In step 43, the pressure sensing arrangement 32 is used to determine the pressure $P_{Oj}$ (j=i) of each member $M_i$ resulting after initial inflation. Next, in step 44, there is determined the desired pressure $P_{Di}$ of each member $M_i$ as a function $F_i$ of the pressures $P_{Oj}$ (j=1, . . . n) obtained in step 43, such that $P_{Di}=F_i(P_{O1}, \ldots, P_{Dn})$. Typically, the subject is on the body support, and each function $F_i$ may involve the sum of all the measured pressures $P_{Oj}$ (j=1, . . . n):

$$\sum_{j=1}^{n} P_{Oj}.$$

This sum is indicative of the total effective weight of the subject on the body support. In the simplest case, in order to effectuate a distribution of the weight among the members $M_i$ in order to achieve comfort in the manner described, for example in assignee's U.S. Pat. No. 5,060,174, this sum is multiplied by a distribution parameter $K_i$ appropriate to the given member. Multiplication by this parameter permits one to arrive at the fraction of the load created by the subject's body on the support that is to be borne by the member $M_i$.

In this case therefore:

$$P_{Di} = K_i \sum_{j=1}^{n} P_{Oj}.$$

In some embodiments of the invention the functions $F_i$ defining the desired pressures may be adjustable by the user, so that firmness of the support may be adjusted for individual users beyond the adjustment made adaptively for the effective weight of the user's body on the support. In this way, an additional dimension of user preference may be accommodated; similarly, this mechanism may be used to compensate for the aging of materials in the support. Such an adjustment may be achieved by adjustment in the constance $K_i$ for each function $F_i$ as shown in the equation above. The adjustment may be implemented by branches, in a program controlling operation of the microprocessor, selected by a user-activated switch.

Owing to the fact that the members need not have equal weight-bearing functions in the support, the sum computed above may in certain embodiments be a weighted slum in order to more accurately reflect the effective weight of the subject on the support. Moreover, the relation between this sum and the desired pressure $P_{Di}$ need not be linear, as the desired inflation pressure of a member may not have a linear relation in certain embodiments to subject weight. However, it is generally preferable that the desired pressure $P_{Di}$ is a monotonic increasing function of the weighted sum of the pressures $P_{Oj}$, so that a heavier body may be supported by greater pressures in each member $M_i$.

In the next step, namely step 45, of the protocol, the pressure of each member $M_i$ is adjusted to a final pressure $P_{Fi}$ that matches the desired pressure $P_{Di}$, so that $P_{Fi}=P_{Di}=F_i(P_{O1}, \ldots, P_{Dn})$.

The order of steps 41 (with 42) and 43 of the protocol is not necessarily critical. Thus step 41 may be performed first for each member $M_i$, and thereafter step 43 may be carried out; that is, first all the members may be inflated, then their pressures may be measured. Alternatively, steps 41 and 43 may be performed individually for each member: that is, first member $M_1$ may be inflated and then its pressure may be read; next member $M_2$ may be inflated and then its pressure may be read; and so on, until all members have been inflated and their pressures after initial inflation have been determined. Similarly, steps 44 and 45 can be performed in immediate succession for a given one of the members $M_i$ before they are carried out for the next one of the members $M_i$; alternatively step 44 may be carried out for all members before step 45 is carried out for any members.

In order to improve the stability and accuracy of the readings obtained from the pressure sensing arrangement 32, the measurements of one or both of the pressure sets $P_{Oj}$ and $P_{Fi}$ may be determined on a time-averaged basis.

As shown by the dashed lines associated with step 46 of FIG. 3, some or all of the protocol may be carried out on a repetitive basis. In step 46, there is determined whether an event trigger has occurred. If the trigger has occurred, the protocol is repeated beginning at step 44, or alternatively the entire protocol is repeated. In one embodiment, the event trigger may be a body-present sensor, a sensor that determines the presence of a body in the support; in such a case, the entire protocol would preferably be repeated. In another embodiment, the event trigger is a user-actuated comfort switch; such a switch might cause a full repeat or it could also include an arrangement for modification of the functions $F_i$ according to user preferences and utilize a limited repeat beginning at step 46. In a further embodiment, the event trigger is a timer, causing a full repetition upon the expiration of a prescribed time interval. In yet another embodiment, the event trigger may be a body activity monitor, causing a full or partial repetition upon the occurrence of a given level of body activity. In further embodiments, any number of these event triggers may be employed concurrently.

Figure 4:
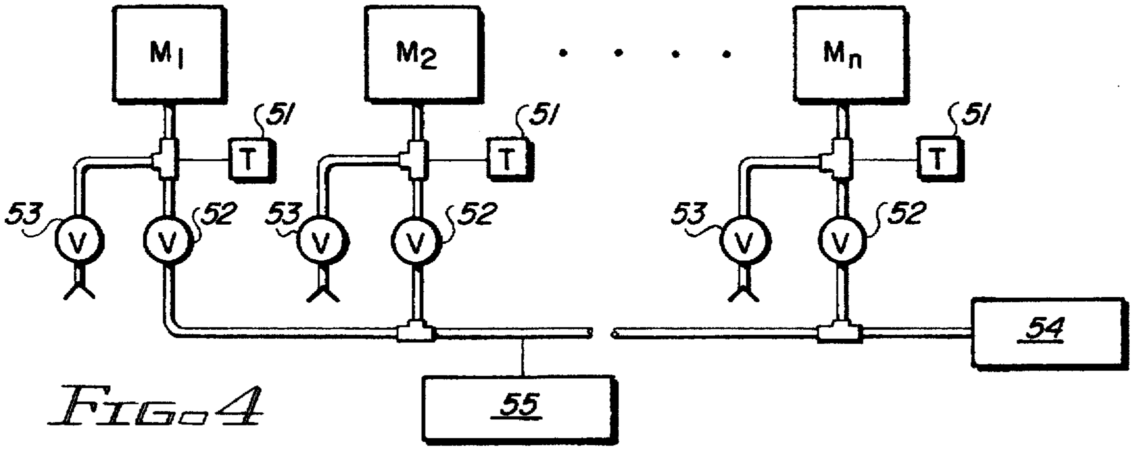
FIG. 4 is a schematic diagram showing one embodiment for implementing the pressure sensing and adjustment shown generally in FIG. 2.

The present invention may be suitably employed in a wide range of hardware environments. FIG. 4 is a schematic diagram showing one embodiment for implementing the pressure sensing and adjustment shown generally in FIG. 2. With each of the inflatable members $M_i$ is associated a pressure transducer 51, a pressure inlet valve 52, and an exhaust valve 53. The pressure inlet valves 52 are all connected to a fluid source 54, which may be realized, for example, by a pump, optionally charging a pressure collecting vessel. All of the valves 52 and 53 are controlled by the microprocessor 55, which is also in communication with the transducers 52. In this embodiment, the hardware makes it possible to charge the members $M_i$ simultaneously or nearly so to different pressures, since separate valves and transducers are associated with each member.

Figure 5:
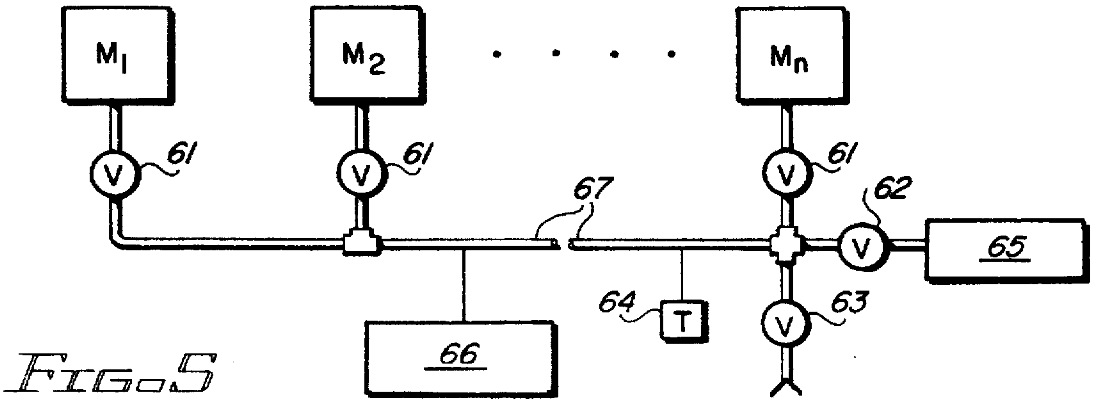
FIG. 5 is a schematic diagram showing another embodiment for implementing the pressure sensing and adjustment shown generally in FIG. 2.

FIG. 5 is a schematic diagram showing another embodiment for implementing the pressure sensing and adjustment shown generally in FIG. 3. In this embodiment, a series of valves 61 opens each member $M_i$ to a common manifold 67. The pressure of the manifold is monitored by the transducer 64, and adjusted by operation of the fluid source valve 62 and the exhaust valve 63. The other side of the fluid source valve is attached to the fluid source 65. The valves 61, 62, and 63 operate under control of the microprocessor 66, which is also in communication with transducer 64. In this embodiment, which has a lower parts count, if the members are to be charged to different pressures, the charging must occur serially, since pressure measurement is conducted from the manifold 67.

What is claimed is:

1. An apparatus for supporting a body portion of a person, the apparatus comprising:

(a) a plurality n of inflatable members $M_i$ (i=1, . . . , n) in a desired configuration, each member being individually adjustable to a desired pressure from a pressure source;

(b) a pressure-sensing arrangement for sensing the pressure in each of the members $M_i$;

(c) a control arrangement for adjusting the pressure in the members $M_i$ according to a protocol, wherein the protocol includes:

(i) initially inflating each member $M_i$ until a predetermined condition has been achieved;

(ii) determining the pressure $P_{Oj}$ (j=i) of each member $M_i$ resulting after initial inflation;

(iii) determining the desired pressure $P_{Di}$ of each member $M_i$ as a function $F_i$ of the pressures $P_{Oj}$ (j=1, . . . n) obtained in step (ii), such that $P_{Di}=F_i(P_{01}, \ldots, P_{0n}$; and (iv) adjusting the pressure of each member $M_i$ to a final pressure $P_{Fi}$ that matches the desired pressure determined for such member in step (iii), such that $P_{Fi}=P_{Di}=F_i(P_{01}, \ldots, P_{0n})$.

2. An apparatus according to claim 1, wherein the predetermined condition is the elapsing of a specified time interval.

3. An apparatus according to claim 1, wherein:

step (c) (ii) of the protocol is performed after the body portion is on the apparatus; and each function $F_i$ of the pressures $P_{Oj}$ includes the weighted sum of the pressures $P_{Oj}$, so that the desired pressures $P_{Di}$ of the members $M_i$ reflect the total effective weight of the body portion.

4. An apparatus according to claim 3, wherein the function $F_i$ of the pressures $P_{Oj}$ includes the simple sum of the pressures $P_{Oj}$.

5. An apparatus according to claim 3, wherein each function $F_i$ is constructed to produce a desired pressure $P_{Di}$ in the member $M_i$ so as to cause a desired fraction of the load of the body portion to be borne by the member $M_i$, and the collection of functions $F_i$ thus causes the load of the body portion to have a desired distribution over the members $M_i$.

6. An apparatus according to claim 5, wherein the desired pressure $P_{Di}$ in the member $M_i$ is a monotonic increasing function of the weighted sum of the pressures $P_{Oj}$, so that a heavier body portion may be supported by greater pressures in each member $M_i$.

7. An apparatus according to claim 6, wherein the pressures in the pressure sets $P_{Oj}$ and $P_{Fi}$ are determined on a time-averaged basis.

8. An apparatus according to claim 3, wherein at least steps (c) (iii) and (c) (iv) of the protocol are performed on a repetitive basis.

9. An apparatus according to claim 8, wherein:

each function $F_i$ is constructed to produce a desired pressure $P_{Di}$ in the member $M_i$ tending to cause a desired fraction of the load of the body portion to be borne by the member $M_i$, and the collection of functions $F_i$ tends to cause the load of the body portion to have a desired distribution over the members $M_i$; and the function $F_i$ for at least two of the members $M_i$ is altered in successive repetitions of the protocol, so as to produce a massage effect.

10. An apparatus according to claim 8, further comprising:

an event-specific trigger for repetition of the protocol.

11. An apparatus according to claim 10, wherein the event-specific trigger is a user-actuated comfort switch.

12. An apparatus according to claim 10, wherein the event-specific trigger is a body-present sensor.

13. An apparatus according to claim 10, wherein the event-specific trigger is a timer.

14. An apparatus according to claim 10, wherein the event-specific trigger is a body-activity monitor.

15. An apparatus according to claim 1, wherein the pressures in at least one of the pressure sets $P_{Oj}$ and $P_{Fi}$ are determined on a time-averaged basis.

16. An apparatus according to claim 15, wherein the pressures in both of the pressure sets $P_{Oj}$ and $P_{Fi}$ are determined on a time-averaged basis.

17. An apparatus according to claim 1, further comprising:

means for modification by the user of at least one of the functions $F_i$ to modify the firmness of the corresponding member(s).

18. A method for adjusting the pressures in an apparatus for supporting a body portion of a person, the apparatus comprising a plurality n of inflatable members $M_i$ (i=1, . . . , n) in a desired configuration, each member being individually adjustable to a desired pressure from a pressure source, a pressure-sensing arrangement for sensing the pressure in each of the members $M_i$, and a control arrangement for adjusting the pressure in the members $M_i$ according to a protocol;

the method comprising the steps of:

(a) determining an initial pressure $P_{Oj}$ (j=i) of each member $M_i$;

(b) determining the desired pressure $P_{Di}$ of each member $M_i$ as a function $F_i$ of the pressures $P_{Oj}$ (j=1, . . . n) such that $P_{Di}=F_i(P_{01}, \ldots, P_{On})$; and (c) adjusting the pressure of each member $M_i$ to a final pressure $P_{Fi}$ similar to the desired pressure, such that $P_{Fi}=P_{Di}=F_i(P_{01}, \ldots, P_{On})$.

19. A method according claim 18, wherein the predetermined condition is the elapsing of a specified time interval.

20. A method according to claim 18, wherein:

step (a) is performed after the body portion is on the apparatus; and each function $F_i$ of the pressures $P_{Oj}$ includes the weighted sum of the pressures $P_{Oj}$, so that the desired pressures $P_{Di}$ of the members $M_i$ reflect the total effective weight of the body portion.

21. A method according to claim 20, wherein the function $F_i$ of the pressures $P_{Oj}$ includes the simple sum of the pressures $P_{Oj}$.

22. A method according to claim 20, wherein the each function $F_i$ is constructed to produce a desired pressure $P_{Di}$ in the member $M_i$ so as to cause a desired fraction of the load of the body portion to be borne by the member $M_i$, and the collection of functions $F_i$ thus causes the load of the body portion to have a desired distribution over the members $M_i$.

23. A method according to claim 22, wherein the desired pressure $P_{Di}$ in the member $M_i$ is a monotonic increasing function of the weighted sum of the pressures $P_{Oj}$, so that a heavier body portion may be supported by greater pressures in each member $M_i$.

24. A method according to claim 20, wherein the pressures in the pressure sets $P_{Oj}$ and $P_{Fi}$ are determined on a time-averaged basis.

25. A method according to claim 20, wherein at least steps (b) and (c) are performed on a repetitive basis.

26. A method according to claim 25, wherein:

each function $F_i$ is constructed to produce a desired pressure $P_{Di}$ in the member $M_i$ so as to cause a desired fraction of the load of the body portion to be borne by the member $M_i$, and the collection of functions $F_i$ thus causes the load of the body portion to have a desired distribution over the members $M_i$; and the function $F_i$ for at least two of the members $M_i$ is altered in successive repetitions of steps (b) and (c), so as to produce a massage effect.

27. A method according to claim 25, wherein the repetition of steps (b) and (c) is triggered by a specific event.

28. A method according to claim 27, wherein the event is actuation of a user-actuated comfort switch.

29. A method according to claim 27, wherein the event is actuation by a body-present sensor.

30. A method according to claim 27, wherein the event is passage of a second specified time interval.

31. A method according to claim 27, wherein the event is actuation by a body-activity monitor.

32. A method according to claim 18, wherein the pressures in at least one of the pressure sets $P_{Oj}$ and $P_{Fi}$ are determined on a time-averaged basis.

33. A method according to claim 32, wherein the pressures in both of the pressure sets $P_{Oj}$ and $P_{Fi}$ are determined on a time-averaged basis.

34. A method according to claim 18 further comprising the step of:

(d) altering the pressure of at least two of the members $M_i$ in successive repetitions so as to produce a massage effect.

35. The method according to claim 34, wherein at least one of steps (a), (b), (c) and (d) are performed on a repetitive basis.

36. An apparatus for supporting a body portion of a person, the apparatus comprising:

(a) a plurality n of inflatable members $M_i$ (i=1, . . . , n) in a desired configuration, each member being individually adjustable to a desired pressure from a pressure source;

(b) a sensing arrangement for sensing comfort as a function of the pressure in each of the members $M_i$;

(c) a control arrangement for adjusting the pressure in the members $M_i$ according to a protocol, wherein the protocol includes:

(i) initially inflating each member $M_i$ until a predetermined condition has been achieved;

(ii) determining an initial comfort value by first measuring the pressure $P_{Oj}$ (j=i) of each member $M_i$ resulting after initial inflation and then calculating the comfort value from the pressures $P_{Oj}$;

(iii) determining a desired comfort value and an associated desired pressure $P_{Di}$ for each member $M_i$, the desired pressure $P_{Di}$ needed to achieve the desired comfort value; and (iv) adjusting the pressure of each member $M_i$ to a final pressure $P_{Fi}$ that matches the desired pressure determined for such member in step (iii), so that the desired comfort value is achieved.

37. An apparatus according to claim 36, wherein the pressures in at least one of the pressure sets $P_{Oj}$ and $P_{Fi}$ are determined on a time-averaged basis.

38. An apparatus according to claim 37, wherein the pressures in both of the pressure sets $P_{Oj}$ and $P_{Fi}$ are determined on a time-averaged basis.

39. An apparatus according to claim 36, wherein at least steps (iii) and (iv) of the protocol are performed on a repetitive basis.

40. An apparatus according to claim 39, wherein step (iv) of the protocol is not performed unless a difference between a previous desired comfort value and a new desired comfort value measured in step (iii) is below a predetermined minimum threshold value or above a predetermined maximum threshold value.

* * * * *